(12) United States Patent
Apacible et al.

(10) Patent No.: US 8,606,739 B2
(45) Date of Patent: Dec. 10, 2013

(54) USING COMPUTATIONAL ENGINES TO IMPROVE SEARCH RELEVANCE

(75) Inventors: Johnson T. Apacible, Mercer Island, WA (US); Mark J. Encarnación, Issaquah, WA (US); Krishnamohan R. Nareddy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 13/041,076

(22) Filed: Mar. 4, 2011

(65) Prior Publication Data

US 2012/0005219 A1    Jan. 5, 2012

Related U.S. Application Data

(63) Continuation-in-part of application No. 12/827,370, filed on Jun. 30, 2010.

(51) Int. Cl.
*G06F 17/00* (2006.01)
*G06N 5/02* (2006.01)

(52) U.S. Cl.
USPC .......................................................... 706/50

(58) Field of Classification Search
None
See application file for complete search history.

(56) References Cited

U.S. PATENT DOCUMENTS

| | | | |
|---|---|---|---|
| 5,987,457 A | 11/1999 | Ballard | |
| 6,647,383 B1 | 11/2003 | August et al. | |
| 6,757,646 B2 | 6/2004 | Marchisio | |
| 7,389,208 B1 | 6/2008 | Solinsky | |
| 7,516,113 B2 | 4/2009 | Horvitz et al. | |
| 7,676,539 B2 | 3/2010 | Jhoney et al. | |
| 2004/0034632 A1 | 2/2004 | Carmel et al. | |
| 2004/0068486 A1* | 4/2004 | Chidlovskii | 707/3 |
| 2007/0282811 A1 | 12/2007 | Musgrove | |
| 2008/0215564 A1 | 9/2008 | Bratseth | |
| 2008/0313144 A1 | 12/2008 | Huston | |
| 2009/0006324 A1 | 1/2009 | Morris et al. | |
| 2009/0089296 A1 | 4/2009 | Stemeseder et al. | |
| 2009/0132517 A1 | 5/2009 | Schneider | |

(Continued)

OTHER PUBLICATIONS

Analyzing and EvaluatingQuery Reformulation Strategies in Web Search Logs Jeff Huang University of Washington Information School cikm09@jeffhuang.com Efthimis N. Efthimiadis University of Washington Information School efthimis@u.washington.edu.*

(Continued)

*Primary Examiner* — Kakali Chaki
*Assistant Examiner* — Ababacar Seck
(74) *Attorney, Agent, or Firm* — Lyon & Harr, LLP; Mark A. Watson

(57) ABSTRACT

An "Iterative Query Reformulator" provides various techniques for using a computational engine to reformulate initial queries through one or more iterations. This query reformulation process ensures that results returned from search engines or recommendation systems using a reformulated query have improved relevance relative to results that would have been returned using only the initial query. More specifically, the Iterative Query Reformulator provides an end to end solution that uses computations from one or more knowledge databases or knowledge sources to find "partial answers" to subqueries derived or extracted from an initial query. These partial answers are then used to reformulate the initial query, with the reformulated query being used by the search engines or recommendations systems to provide results that are highly relevant to the initial query. Determinations of whether to continue reformulation iterations are based on evaluating user metrics from historical search logs having queries that match reformulated queries.

20 Claims, 3 Drawing Sheets

(56) References Cited

U.S. PATENT DOCUMENTS

| | | |
|---|---|---|
| 2009/0192966 A1 | 7/2009 | Horvitz et al. |
| 2009/0234813 A1 | 9/2009 | Gutlapalli et al. |
| 2009/0281966 A1 | 11/2009 | Biggs et al. |
| 2010/0036830 A1 | 2/2010 | Lee |
| 2010/0191758 A1 | 7/2010 | Peng et al. |
| 2010/0306213 A1 | 12/2010 | Taylor et al. |
| 2011/0161129 A1 | 6/2011 | Barsoba et al. |
| 2011/0289063 A1 | 11/2011 | Radlinski et al. |

OTHER PUBLICATIONS

Chen, T. Y., Final Office Action, U.S. Appl. No. 12/827,370, Nov. 21, 2012, pp. 1-12.

Blodget, Henry, "Search Engine Wolfram Alpha Launches With Big Dreams and No Chance", Retrieved at << http://www.businessinsider.com/henry-blodget-wolfram-alpha-another-new-search-engine-launches-2009-5 >>, May 18, 2009, pp. 1-14.

"How Many Calories in a Burger? What's 2∧2∧2∧2∧2? Bing and Wolfram|Alpha Have the Answers", Retrieved at << http://www.bing.com/community/Site_Blogs/b/search/archive/2009/11/11/how-many-calories-in-a-burger-what-s-2-2-2-2-2-bing-and-wolfram-alpha-have-the-answers.aspx >>, Nov. 11, 2009, pp. 1-4.

Braga, et al., "NGS: A New Generation Search Engine Supporting Cross Domain Queries?", Retrieved at << http://www.inf.unibz.it/~calvanese/papers/brag-etal-SEBD-2008.pdf >>, Proc. of the 16th Italian Conf. on Database Systems, Jun. 2008, pp. 8.

Agrawal, et al., "Exploiting Web Search Engines to Search Structured Databases", Retrieved at << http://www2009.org/proceedings/pdf/p501.pdf >>, Proceedings of the 18th international conference on World wide web, Apr. 20-24, 2009, pp. 501-510.

Bian, J., Y. Liu, E. Agichtein, H. Zha, Finding the right facts in the crowd: Factoid question answering over social media, Proc. of the 17th Int'l Conf. on World Wide Web, Apr. 21-25, 2008, pp. 467-476, Beijing, China, ACM press.

Glöckner, I., Filtering and fusion of question-answering streams by robust textual inference, Proc. of the 3rd Int'l Workshop on Knowledge and Reasoning for Answering Questions, (KRAQ'07), pp. 43-48, Hyderabad, India.

Khoussainov, R., Economics of distributed web search: A machine learning approach, National University of Ireland, Dublin, Thesis, Aug. 2004, pp. 1-224.

Chen, T. Y., Office Action, U.S. Appl. No. 12/827,370, Mar. 22, 2012.

Azari, D., E. Horvitz, S. T. Dumais, E. Brill, Actions, answers, and uncertainty: A decision-making perspective on Web-based question answering, Inf. Processing and Management, Sep. 2004, pp. 849-868, vol. 40, No. 5.

* cited by examiner

USING COMPUTATIONAL ENGINES TO IMPROVE SEARCH RELEVANCE

CROSS-REFERENCE TO RELATED APPLICATIONS

This application is a Continuation-in-Part of a prior application entitled "INTEGRATING SPECIALIZED KNOWLEDGE SOURCES INTO A GENERAL SEARCH SERVICE" which was filed with the USPTO on Jun. 30, 2010 and assigned Ser. No. 12/827,370, the subject matter of which is incorporated herein by this reference.

BACKGROUND

1. Technical Field:

An "Iterative Query Reformulator", as described herein, uses a computational engine to process and reformulate an initial query through one or more iterations so that results returned from a search engine or recommendation system using a final reformulated query have improved relevance relative to results that would have been returned using only the initial query.

2. Related Art:

Typical search engines rely on linguistic matches to find documents that are relevant to a user's query. For example, if a user enters the simple search query {Barak Obama}, the search engine will generally return a group of sorted links or responses that are the most popular for that query. Further, given the specificity and simplicity of that initial query, most of the links returned are likely to be highly relevant to that query. However, if the user enters a slightly more complex query, such as, for example, {wife of Barak Obama}, typical search engines will generally return a number of links or responses that might not be relevant. In particular, many of the links or responses returned by the search engine from the second query will generally still refer to or include information relating to Barak Obama, but may not be the most relevant links for Michelle Obama, who is the intended target of the second query.

More specifically, typical search services and question-answering systems generally depend on techniques for analyzing free-text queries or questions, and also depend on techniques for composing or identifying relevant information or explicit answers from one or more data sets or databases of information. Providing relevant information or explicit answers to freely worded queries or questions is generally a challenging problem because a structured or unstructured dataset being searched may not contain explicit matching information or answers. In addition a data set may contain multiple variants of relevant answers or answer components.

Various approaches to information retrieval and question answering have relied on the application of several key concepts from information retrieval, information extraction, machine learning, and natural language processing (NLP). Automatic question answering from a single, constrained information source is extremely challenging. Consider the difficulty of gleaning an answer to the question "Who killed Abraham Lincoln?" from a source which contains only the text "John Wilkes Booth altered history with a bullet. He will forever be known as the man who ended Abraham Lincoln's life." However, answering a question is easier when the vast resources of the internet are used, since hundreds of web pages contain the literal string "killed Abraham Lincoln," providing multiple opportunities for matching and composition.

Many efforts in question answering have focused on fact-based, short-answer questions such as "Who killed Abraham Lincoln?", "What was the length of the Wright brothers first flight?", "When did CNN begin broadcasting" or "What two US biochemists won the Nobel Prize in medicine in 1992?" Some question-answering systems have used NLP analyses to augment standard information retrieval techniques. These systems may identify candidate passages using information retrieval (IR) techniques, and then perform more detailed linguistic analyses of both the question and matching passages to find specific answers. A variety of linguistic resources (part-of-speech tagging, parsing, named entity extraction, semantic relations, dictionaries, etc.) may be used to support question answering. Other approaches may use general information retrieval techniques that employ methods for rewriting questions or reformulating queries to match the format of answers and then combine multiple results to generate answers.

Other techniques, such as, for example, the well-known "Wolfram|Alpha" search platform, provide a computational engine for search. In general, such techniques begin by performing a data curation process on a domain by domain basis, relying on human domain experts who use a variety of sophisticated tools to perform targeted curation on large data sets as well as to provide linguistic or grammatical support. Using those same tools, the domain expert can also specify that types of computations (in predefined formats) are possible within the domain using an existing ontology to ensure consistency and to allow computations via user entered queries. Once the domain expert has curated the data, that data is then added to a dedicated computational pod that operates on both the data and various expert-defined rules in order to return one or more answers based on queries sent to it by a language parser. Unfortunately, one potential weakness of typical computational engine based platforms is the absence of search query logs, which among other things, limits the ability of such platforms to determine user intent, relevance, ranking, and determine the domains and the appropriate data sources to curate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, an "Iterative Query Reformulator," as described herein, provides various techniques for using a computational engine to reformulate initial queries through one or more iterations. This iterative query reformulation process ensures that results returned from a search engine or recommendation system using a final reformulated query have improved relevance relative to results that would have been returned using only the initial query alone.

More specifically, the Iterative Query Reformulator provides an end to end solution that uses automated computations to derive partial answers for "subqueries" (defined as a portion of the initial query that is extracted from the initial query using grammatical and statistical tools) from one or more knowledge databases (also referred to herein as "structured data" or "knowledge sources"). However, in contrast to other expert knowledge or computational engine type systems that attempt to answer a question or query directly, rather than return these partial answers to the user, these partial answers are instead used to reformulate the initial query to help search engines (or recommendation systems) provide highly relevant ranked results to the user.

In various embodiments, the query reformulation process iterates until satisfactory search or recommendation results are achieved based on an evaluation of user response metrics relative to returned results, or until such time as the further query reformulations are either not possible or until further reformulations indicate a decrease in result satisfaction (determined by evaluating entries in historical search logs). However, it should be understood that even where further reformulations indicate a static level or even a decrease in user satisfaction levels, the Iterative Query Reformulator may continue to reformulate the query until further reformulations are not possible, since the next iteration may produce a higher user satisfaction level. In fact, in the most general embodiment, the Iterative Query Reformulator considers all possible query reformulations alterations (assumed to be a finite number) and then chooses one or more query reformulations having the highest user satisfaction levels for presentation to the user.

In other words, the Iterative Query Reformulator uses the results of computations derived from structured data for a particular query or subquery to improve relevance of search results by reformulating the query and then searching on that reformulated query. More specifically, this computational process uses various grammatical and statistical tools to identify one or more [entity, property] pairs in the initial query to construct the subqueries. These [entity, property] pairs are then submitted to automatically identified knowledge sources which then return high confidence partial answers to subqueries. The resulting high-confidence partial answers are then used to reformulate the original query through one or more iterations.

For example, the query {Barack Obama's wife's brother} has a subquery of {Barack Obama's wife}, i.e., an entity of "Barack Obama" and a property of "wife". A high confidence partial answer to this subquery is {Michelle Obama}. When this partial answer is then used to reformulate the original query, the reformulated query becomes {Michelle Obama's brother}. When this query is then submitted to a search engine, it returns multiple instances of the desired search target of "Craig Malcolm Robinson" among the highest ranked query results. In contrast, the initial query of {Barack Obama's wife's brother} is substantially less likely to return many highly ranked instances of the desired search target.

The solution provided by the Iterative Query Reformulator further includes processes for building a computational engine from structured data sources that are selected based on relevance to particular entities, identifying target query sets that will benefit from reformulation by the computational engine, and integrating the results into a main or primary search index of one or more search engines or recommendation systems. However, it should be appreciated that existing computational engines may be adapted for use in query reformulation.

In view of the above summary, it is clear that the Iterative Query Reformulator described herein provides various techniques for using computational engines to reformulate queries in an iterative process that improves search relevance for particular queries. In addition to the just described benefits, other advantages of the Iterative Query Reformulator will become apparent from the detailed description that follows hereinafter when taken in conjunction with the accompanying drawings.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, an "Iterative Query Reformulator," as described herein, provides various techniques for using a computational engine to reformulate initial queries through one or more iterations. This iterative query reformulation process ensures that results returned from a search engine or recommendation system using a final reformulated query have improved relevance relative to results that would have been returned using only the initial query alone.

More specifically, the Iterative Query Reformulator provides an end to end solution that uses automated computations to derive partial answers for "subqueries" of a query from one or more knowledge databases (also referred to herein as "structured data" or "knowledge sources"). However, in contrast to other expert knowledge or computational engine type systems that attempt to answer a question or query directly, rather than return these partial answers to the user, these partial answers are instead used to reformulate the initial query to help search engines (or recommendation systems) provide highly relevant ranked results to the user.

In other words, the Iterative Query Reformulator uses the results of computations derived from structured data for a particular query or subquery to improve relevance of search results by reformulating the query and then searching on that reformulated query. More specifically, this computational process uses various grammatical and statistical tools to identify one or more [entity, property] pairs in the initial query to construct the subqueries. These [entity, property] pairs are then submitted to automatically identified knowledge sources which then return high confidence partial answers to subqueries. The resulting high-confidence partial answers are then used to reformulate the original query through one or more iterations. Determinations of whether to continue reformulation iterations are based on an evaluation of user metrics derived from entries in historical search logs having queries that match reformulated queries.

Figure 1:
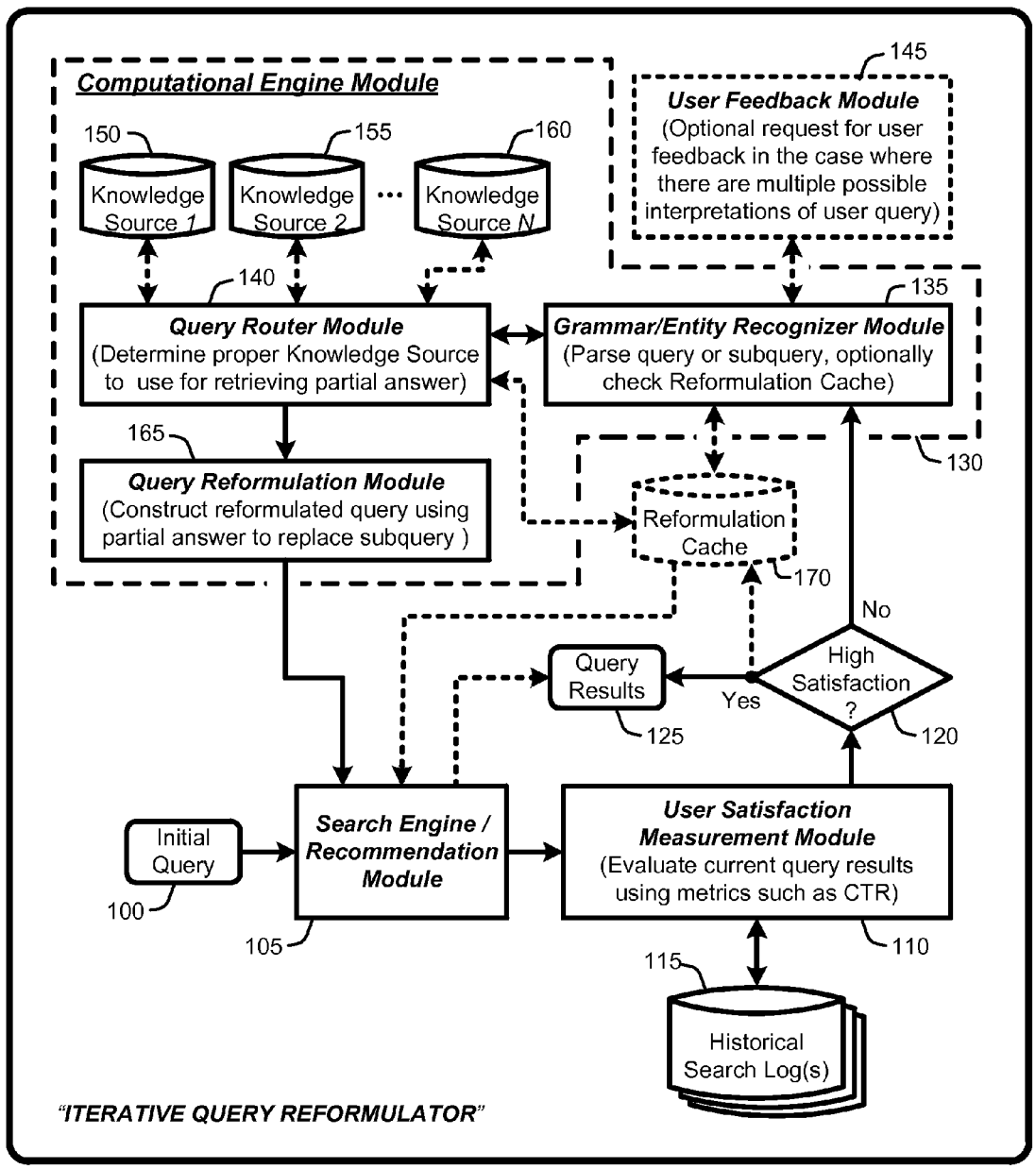
FIG. 1 provides an exemplary architectural flow diagram that illustrates program modules for implementing various embodiments of an "Iterative Query Reformulator," as described herein.

1.1 System Overview:

As noted above, the "Iterative Query Reformulator," provides various techniques for using computational engines to reformulate queries in an iterative process that improves search relevance for particular queries. The processes summarized above are illustrated by the general system diagram of FIG. 1. In particular, the system diagram of FIG. 1 illustrates the interrelationships between program modules for implementing various embodiments of the Iterative Query Reformulator, as described herein. Furthermore, while the system diagram of FIG. 1 illustrates a high-level view of various embodiments of the Iterative Query Reformulator, FIG. 1 is not intended to provide an exhaustive or complete illustration of every possible embodiment of the Iterative Query Reformulator as described throughout this document.

In addition, it should be noted that any boxes and interconnections between boxes that may be represented by broken or dashed lines in FIG. 1 represent alternate embodiments of the Iterative Query Reformulator described herein, and that any or all of these alternate embodiments, as described below, may be used in combination with other alternate embodiments that are described throughout this document.

In general, as illustrated by FIG. 1, the processes enabled by the Iterative Query Reformulator begin operation by receiving an initial query 100 from a user input. Note that well-known conventional methods such as keyboard or speech-based input, for example, are used to provide or input the initial query 100, and that such well-known input methods are not discussed herein. The initial query 100 is then provided to a search engine/recommendation module 105. In general, the search engine/recommendation module 105 operates in the same manner as conventional search engines (e.g., Bing™, Google™, etc.) or recommendation systems (e.g., Amazon.com®, etc.) after receiving a query, with the exception that prior to returning query results to the user (in response to the initial query 100), those ranked query results are first evaluated by a user satisfaction measurement module 110.

More specifically, the user satisfaction measurement module 110 receives the ranked query results returned by the search engine/recommendation module 105 in response to the initial query. Those ranked query results are then evaluated in view of one or more historical search logs 115 comprising user metrics, such as, but not limited to, click-through rates (CTR), re-queries (i.e., another query entered by the user in an attempt to get better results), search engine switching (i.e., user switched from one search engine to another), etc. to determine a user satisfaction level. However, for purposes of explanation, the following discussion will focus on the use of CTR for purposes explanation, with the understanding that user satisfaction can be measured using any of a variety of user metrics, or any desired combination of user metrics, that include but are not limited to CTR.

In general, query results having a high CTR will correspond to higher satisfaction levels, with results having a low CTR, high re-query and/or high switching rates corresponding to lower satisfaction levels. Therefore, prior to returning any query results to the user, a determination 120 is made as to whether the current query results indicate a sufficiently high satisfaction level. Note that thresholds for measuring this satisfaction level can be adjusted up or down, if desired. However, it should also be understood that in various embodiments, the Iterative Query Reformulator may not show results of a query based on past performance (e.g., user satisfaction). This allows the Iterative Query Reformulator to respond to new queries (i.e., queries that have not been previously processed by the Iterative Query Reformulator). For example, instead of relying on CTR for a specific query, the Iterative Query Reformulator may use an aggregate measure for a specific technique or a specific type of transformation rather than rely solely on metrics for a specific query instance. For example, queries involving one substitution are a different type than queries involving two substitutions (e.g., "Barak Obama's wife" vs "Barak Obama's wife's brother").

In the case that the current query results indicate a sufficiently high satisfaction level, then final query results 125 are output to the user using well-known conventional techniques (e.g., display device, printout, etc.). However, in the case that the current query results do not indicate a sufficiently high satisfaction level, then the initial query 100 is provided as a "current query" to a computational engine module 130 that, in general, evaluates the grammar of the current query, determines partial answers to subqueries identified or extracted from the current query, then reformulates that current query for resubmission to the search engine/recommendation module 105, followed by another evaluation by the user satisfaction measurement module 110. If the reformulated query does not result in a measurable increase in satisfaction rate, then the original query will be used as is.

Further, it should be understood that even where further reformulations indicate a static level or even a decrease in user satisfaction levels, the Iterative Query Reformulator may continue to reformulate the query until further reformulations are not possible, since the next iteration may produce a higher user satisfaction level. In fact, in the most general embodiment, the Iterative Query Reformulator considers all possible query reformulations alterations (assumed to be a finite number) and then chooses one or more query reformulations having the highest user satisfaction levels (or other measure) for presentation to the user.

As discussed in further detail herein, various examples of a "computation engine" that can be adapted to provide to provide the functionality of the computational engine module 130 described herein, is described in a co-pending patent application entitled "INTEGRATING SPECIALIZED KNOWLEDGE SOURCES INTO A GENERAL SEARCH SERVICE" which was filed with the USPTO on Jun. 30, 2010 and assigned Ser. No. 12/827,370, the subject matter of which is incorporated herein by this reference. This copending patent application generally describes various methods for using a general search engine interface to receive a search query from a user in combination with various techniques for using a query reformulation module to reformulate that query for use by an expert knowledge engine. However, it should be appreciated that the computational engine techniques described in the co-pending patent application are not intended to limit the scope of the types of computational engines that are adaptable for use with the Iterative Query Reformulator, and that the co-pending patent application is cited merely for purposes of explanation and example.

More specifically, the computational engine module 130 generally includes a grammar/entity recognizer module 135 that receives the current query in the event that the current query results do not indicate a sufficiently high satisfaction level. As discussed in further detail in Section 2.2, the grammatical rules used by the grammar/entity recognizer module 135 operate, in part, by parsing the current query to identify one or more "entities" and associated "properties" that define entity characteristics or answers. Once identified, these [entity, property] pairs are treated as "subqueries" that are then passed to a query router module 140. Examples of categories of entities include, but are not limited to, place names (e.g., France, Yellowstone, Antarctica, etc.), people (e.g., Elvis Presley, George Washington, etc.), physical items (e.g., microwave ovens, cars, etc.), etc. As noted above, properties define or refer to entity characteristics or answers associated with the entity. For example, properties associated with the entity of "France" include, but are not limited to, "population", "capital", "language", etc. Note however, that more complex grammatical constructions can be extracted from the query, and these examples are provided only for purposes of explanation.

Note that in the event that the grammar/entity recognizer module 135 detects more than one possible subquery in the current query, an optional user feedback module 145 can be used to directly request feedback from the user as to which of one or more subqueries were intended in the initial query 100. In this case, the user can identify one or more of these subqueries as being either valid, or invalid, with valid subqueries then being passed to the query router module 140, as noted above.

As noted above, once the grammar/entity recognizer module 135 has parsed or extracted one or more subqueries from the current query, those subqueries are then passed to a query router module 140. In general, the query router module 140 determines or identifies which knowledge source (150, 155, or 160) from a set of one or more expert knowledge sources available to the computational engine module 130 is most likely to contain the correct partial answer to each subquery. The query router module 140 then uses this determination to retrieve an answer from the identified knowledge source (150, 155, or 160). For example, assuming that the subquery is {France capital}, the partial answer retrieved from a knowledge source that includes curated country capital information will be "Paris".

The partial answer retrieved by the query router module 140 is then sent to a query reformulation module 165. In general, the query reformulation module 165 uses the partial answer to reformulate the current query by using the partial answer to replace the subquery portion of the query. For example, assume that the current query is {population France capital} and that the subquery of {France capital} returns the partial answer of "Paris". Then, the reformulated query becomes {population Paris}.

The reformulated query is then sent back to the search engine/recommendation module 105. The search engine/recommendation module 105 then treats the reformulated query in the same manner as described above for the initial query 100. In particular, the reformulated query (now referred to as the "current query") is used to by the search engine/recommendation module 105 to retrieve a set of ranked results that are then evaluated by the user satisfaction measurement module 110. If the ranked results of the current query, e.g., {population Paris} to continue the preceding example, have a sufficiently high satisfaction level, than those ranked results are presented to the user as the final query results 125, otherwise, the Iterative Query Reformulator will repeat the steps described above to perform another reformulation iteration. Note that these iterations can be repeated until the current query no longer contains enough information for identifying additional subqueries for reformulation purposes. In this case, the search engine/recommendation module 105 will return the query results associated with the most current query reformulation. However, it should be noted that the example initial query used in the preceding example, i.e., {population France capital}, is generally too short to proceed through multiple iterations of query reformulation. Examples of more complex queries requiring multiple reformulation iteration are discussed in Section 2.2.

In general, the reformulation techniques summarized above can be extended to not only work with a search engine e.g., Bing™, but also to any search, recommendation, of answer systems that have access to expert knowledge sources. As an example, a recommendation/shopping site like Amazon.com® could use the techniques described herein to handle queries such as {latest call of duty}. Making this query on Amazon.com® will not result in the desired links to the video game "Call of Duty: Black Ops" (which is the latest version of the game as of the writing of this document). However, a knowledge source that has access to the game information and has an adequate grammar can rewrite or reformulate this query to {call of duty black ops}. Amazon.com® can then make this query on its main search interface (instead of the original unanswerable query) to direct the user to the right page for purchasing that game. Such embodiments are quite useful when the user has only partial information as to what she is looking for.

One variation on the above-described infrastructure is to cache and/or preprocess various computations (i.e., partial answers for used for query reformulations). In such embodiments, this means that the query router module 140 will use a reformulation cache 170 to store computations that it has seen in the past or anticipate based on previous data, i.e. user behavior. An example of these anticipated queries would be {end of daylight savings} that tend to spike around the end of October. Results can also be pre-cached for some or all of the most popular query reformulations that are observed. In this embodiment, the grammar/entity recognizer module 135 will first check the reformulation cache 170 to see whether the current query has previously been reformulated to a high satisfaction query. If so, then that high satisfaction reformulated query is then passed directly back to the search engine/recommendation module 105 without further processing by the computational engine module 130 in the manner described above for identifying subqueries and reformulating the current query using partial answers.

In yet another embodiment, the query router module 140 will retrieve partial answers for a particular subquery from multiple different knowledge sources (150, 155, and/or 160). Reasons for retrieving multiple answers include difficultly in determining specific topics of interest in the initial query, thereby making the identification of the appropriate knowledge source (150, 155, and/or 160) more difficult. In this case, the use of several different partial answers for a particular subquery allows the query reformulation module to create several versions or candidates of a reformulated query. The user satisfaction module 110 can then proceed with the version of the reformulated query that produces query results having the highest level of user satisfaction. In various alternate embodiments, the search engine/recommendation module 105 will offer some or all of the other reformulation candidates to the user as suggestions for possible queries.

In further embodiments, the Iterative Query Reformulator learns what types of queries might benefit from reformulation based on low user satisfaction levels, but that could not be reformulated because of the lack of an appropriate knowledge source. By tracking such reformulation failures over time, various entity extraction techniques can be used to estimate the approximate topics and grammar patterns of the queries associated with these failed reformulations. Using this data, the Iterative Query Reformulator can evaluate the potential value of various competing knowledge sources and which ones are good candidate for data curation. Further, this data can be used offline to determine types or content for new knowledge sources that would be a useful addition to the overall Computational Engine Module 130.

2.0 Operational Details of the Iterative Query Reformulator:

The above-described program modules are employed for implementing various embodiments of the Iterative Query Reformulator. As summarized above, the Iterative Query Reformulator provides various techniques for using computational engines to reformulate queries in an iterative process that improves search relevance for particular queries. The following sections provide a detailed discussion of the operation of various embodiments of the Iterative Query Reformulator, and of exemplary methods for implementing the program modules described in Section 1 with respect to FIG. 1. In particular, the following sections provide examples and operational details of various embodiments of the Iterative Query Reformulator, including: computational engine construction and use; grammatical rules and subquery identification; query reformulation; and results presentation.

2.1 Computational Engine Construction and Use:

Among the solutions provided by the Iterative Query Reformulator are processes for automatically building a computational engine from structured data sources that are selected based on relevance to particular queries (or subqueries), identifying target query sets that will benefit from reformulation by the computational engine, and integrating the results into a main or primary search index of one or more search engines or recommendation systems.

In general, a computational layer or computational engine is logic that can work cross domains and can perform basic database operations (e.g., joins), as well as math and statistical operations (e.g., ave, max, min, etc.) on data. Note that there is a wide variety of techniques available for this purpose, and that any al all of these techniques can be adapted to construct or implement the computational engine discussed herein. Consequently, it should be understood that it is not the intention of this document to dictate the technology to use for implementing the computational engine of the Iterative Query Reformulator. Instead, the following paragraphs describe in general terms how data can be curated at large scales for generation of expert knowledge sources for use in triggering on the data, specifying computations, and leveraging information such as historical user search logs.

One solution for building the computational engine involves using these existing structured data to infer an ontology, initially at the domain level, and finally at the global level. The ontology can be build using existing algorithms that can infer synonyms and relationships by using techniques such as mining the search logs and using n-gram analysis. More specifically, an ontology can be considered as a body of formally represented knowledge based on a conceptualization, such that the objects, concepts, and other entities that are assumed to exist in some area of interest and the relationships that hold among them. As such, one embodiment of the ontology used to represent the expert knowledge sources described herein include data in a structured storage such as a traditional database or a triple store. The records can be accessed using a structured query language such as, for example, T-SQL. Further, these knowledge sources can make use of domain data in combination with an existing computational engine to identify the queries that search engine users have made that may have computational intent, e.g., {Barack Obama's wife's brother}.

Note that various examples describing embodiments of a system for integrating expert knowledge sources into a general search service are described in the aforementioned co-pending patent application entitled "INTEGRATING SPE-CIALIZED KNOWLEDGE SOURCES INTO A GENERAL SEARCH SERVICE" which was filed with the USPTO on Jun. 30, 2010 and assigned Ser. No. 12/827,370, the subject matter of which is incorporated herein by this reference. This copending patent application generally describes various methods for using a general search engine interface to receive a search query from a user. These methods then describe various techniques for using a query reformulation module to reformulate a query for use by an expert knowledge engine (also referred to as a "computational engine").

As such, the techniques described in the co-pending application are adapted to derive the partial answers to subqueries, as discussed herein, that are then used to reformulate the initial query for use by the search engine or recommendation system. However, in contrast to the co-pending application, in various embodiments, the query reformulation process used by the Iterative Query Reformulator does not return partial answers directly to the user, and also continues (or iterates) until satisfactory search or recommendation results are achieved based on an evaluation of user response metrics relative to returned results, or until such time as the further query reformulations are either not possible or unless further reformulations provide decreasingly satisfactory results.

2.2 Grammatical Rules and Subquery Identification:

Search engines typically have a number of domain specific structured contents maintained by owners of the different "verticals" or expert knowledge sources. Examples of these verticals are cities, geography, Wolfram|Alpha, travel, entertainment, weather, commerce/shopping, etc. Data is referred to as "structured" if the data have some context information attached to it. This information may come in the form of simple metatags that express the meaning of the data item; or the data itself is formatted using a known schema which expresses not only the meaning but also a hierarchy; or the data item's relationship to other data items is provided as part of the data. Various embodiments of the Iterative Query Reformulator use the latter form although this should not be interpreted to preclude the technology from being used for the former, as such technology can transform the simple form into the more structured form if the corpus of the knowledge source is sufficiently large.

In general, one technique used by the Iterative Query Reformulator to identify computational intent is to identify the different parts of a user's query and then use various rules to simplify the query by recursively identifying subqueries or known patterns and substituting known entities or computations for that particular pattern. For example, the query {what is Barack Obama's wife's age} can be parsed into <what is> <barack obama> <wife> <age>. Then, using an entities dictionary constructed using the different knowledge sources, <barack obama> is identified as an entity in a person knowledge source. Looking at the known patterns for that source, it can be seen that <person> <wife> is a valid pattern, that, in this case, has the value of <michelle obama>. The query can now be reformulated as <what is> <michelle obama> <age>. If it is then determined through the query logs that the search results for this query has a high satisfaction level or rate based on the user metrics summarized in Section 1.1, the Iterative Query Reformulator can stop the query reformulation at this step. Conversely, if the metrics show low user satisfaction levels, the Iterative Query Reformulator can attempt to do another iteration and simplify the subquery <michelle obama> <age>, which is another valid pattern for the person knowledge source. This will then provide the final simplification, which in this case is the actual answer, that Michelle Obama is currently 47 years old.

One way that the above-described reformulation process can be generalized is by identifying and recursively simplifying patterns with the form {<entity-of-knowledge-type-A> <property-of-entity>}.

There is a possibility that there exists more than one knowledge base or expert knowledge source that can claim the same entity. For example <barack obama> can also belong to a knowledge source for "politicians" or "US presidents". The Iterative Query Reformulator will simply use recursion through each of the various knowledge sources to try to simplify the query and pick the one that either gives an answer, or a final subquery, that has the highest satisfaction metric.

In some instances, query reformulations using this method may not be feasible due to performance issues. The Iterative Query Reformulator can keep track of reformulation decisions that have been made and follow the same steps for all the entities for the knowledge sources that were involved. The query reformulations are then either displayed as actual answers (age for example), or as query alteration suggestions (i.e., reformulated queries) for the user. In various embodiments, in the case of query alteration suggestions, the action of the user to either accept or reject the suggestion is used as a feedback mechanism to help the Iterative Query Reformulator pick between possible competing query reformulations.

For example, consider the query {Barack Obama wife's age}, "Barack Obama" is identified as an <entity> in the people domain, while "wife" is a <property> in the people domain. Therefore, using an existing computational engine it can be seen that the result of "Barack Obama" "wife" which is interpreted as <people> <property> is "Michelle Obama", which is another <entity> in the people domain. Therefore, "Michelle Obama" is added as a query alteration candidate for the search engine.

2.3 Examples of Queries and Query Reformulation:

For example, the query {Barack Obama's wife's brother} has a potential subquery of {Barack Obama's wife}. A high confidence partial answer to this subquery is {Michelle Obama}. When this partial answer is then used to reformulate the original query, the reformulated query becomes {Michelle Obama's brother}. When this query is then submitted to a search engine, it returns multiple instances of the desired search target of "Craig Malcolm Robinson" among the highest ranked query results. In contrast, the initial query of {Barack Obama's wife's brother} is substantially less likely to return many highly ranked instances of the desired search target.

As discussed in further detail herein, the grammatical and statistical processes used for selecting subqueries and retrieving partial answers for those subqueries involves determining which of one or more structured data sets is most likely to return the proper partial answer to the subquery. This process further involves the identification of "entities" (places, people, things, etc.) as the subjects or targets of subqueries within the initial query. These entities are then used to identify the appropriate structured data sets from which to retrieve partial answers for use in reformulating the initial query. For example, the initial query {france capital population}, is evaluated to include a "country" entity "France", of which the capital (i.e., the partial answer to the subquery {France capital}) is "Paris", which is itself a "city" entity. This partial answer is then used to reformulate the initial query to {paris population}. A search engine is much more likely to return more relevant results for this reformulated query in contrast to the results that would be returned in response to the initial query.

An interesting variation on this process is where a particular subquery has several equally likely, and equally correct, partial answers. For example, consider the case where the initial query is {Europe capital population}. In this case, Europe includes a large number of countries (e.g., France, Germany, Spain, Italy, etc.). Therefore, in various embodiments, the Iterative Query Reformulator will first identify a set of possible partial answers for a {Europe capital} subquery (i.e., Paris, Berlin, Madrid, Rome, etc.), then return a set of reformulated queries for the user to choose between (e.g., {Paris population}, {Berlin population}, {Madrid population}, {Rome population}, etc.). Alternately, in a related embodiment, each of these separate subqueries can be individually answered for the user by using a search engine to return the population of the capital city of every European country.

Further, as noted above, the Iterative Query Reformulator provides various techniques for using a computational engine to reformulate initial queries through one or more iterations. The above examples generally required only one reformulation iteration. However, a more complicated initial query, such as, for example, {Barack Obama's wife's brother's children} has a first subquery of {Barack Obama's wife}. A high confidence answer to this subquery is {Michelle Obama}. When this partial answer is then used to reformulate the original query, the reformulated query becomes {Michelle Obama's brother's children}. This reformulated query has a second subquery of {Michelle Obama's brother}. A high confidence partial answer to this subquery is {Craig Malcolm Robinson}. When this partial answer is then used to reformulate the previously reformulated query, the newly reformulated query becomes {Craig Malcolm Robinson's children}. When this query is then submitted to a search engine as the current query, it returns high confidence results that include the desired answer that "Craig Malcolm Robinson" has a son "Avery" and a daughter "Leslie". In contrast, the initial query of {Barack Obama's wife's brother's children} is substantially less likely to return those same results.

Note however, that, in various embodiments, rather than automatically performing multiple iterations to reduce or reformulate the initial query to the greatest possible extent, the reformulated query is evaluated after each iteration to determine whether that reformulated query returns satisfactory results based on an evaluation of historical user metrics (such as click through rates, for example) to determine whether that reformulated query is likely to provide high satisfaction results. If not, then the query is reformulated through another iteration, if possible. Consequently, one advantage of these embodiments is that queries are reformulated, one piece at a time, until they reach the point where they provide results to the user that are expected to be highly satisfactory based on the historical search logs of many thousands or millions of prior users.

2.4 Results Presentation using Reformulated Queries:

In general the operation of most embodiments of the Iterative Query Reformulator are transparent to the user, such that the user is not aware that their query has been reformulated prior to presenting the query results to the user. In this sense, any search engine or recommendation system, or the like, making use of the Iterative Query Reformulator will simply reformulate the user query and present the user with query results corresponding to the reformulate query. However, as noted above, in various embodiments, the user is presented with various options to approve or select one or more reformulated queries or subqueries.

Figure 2:
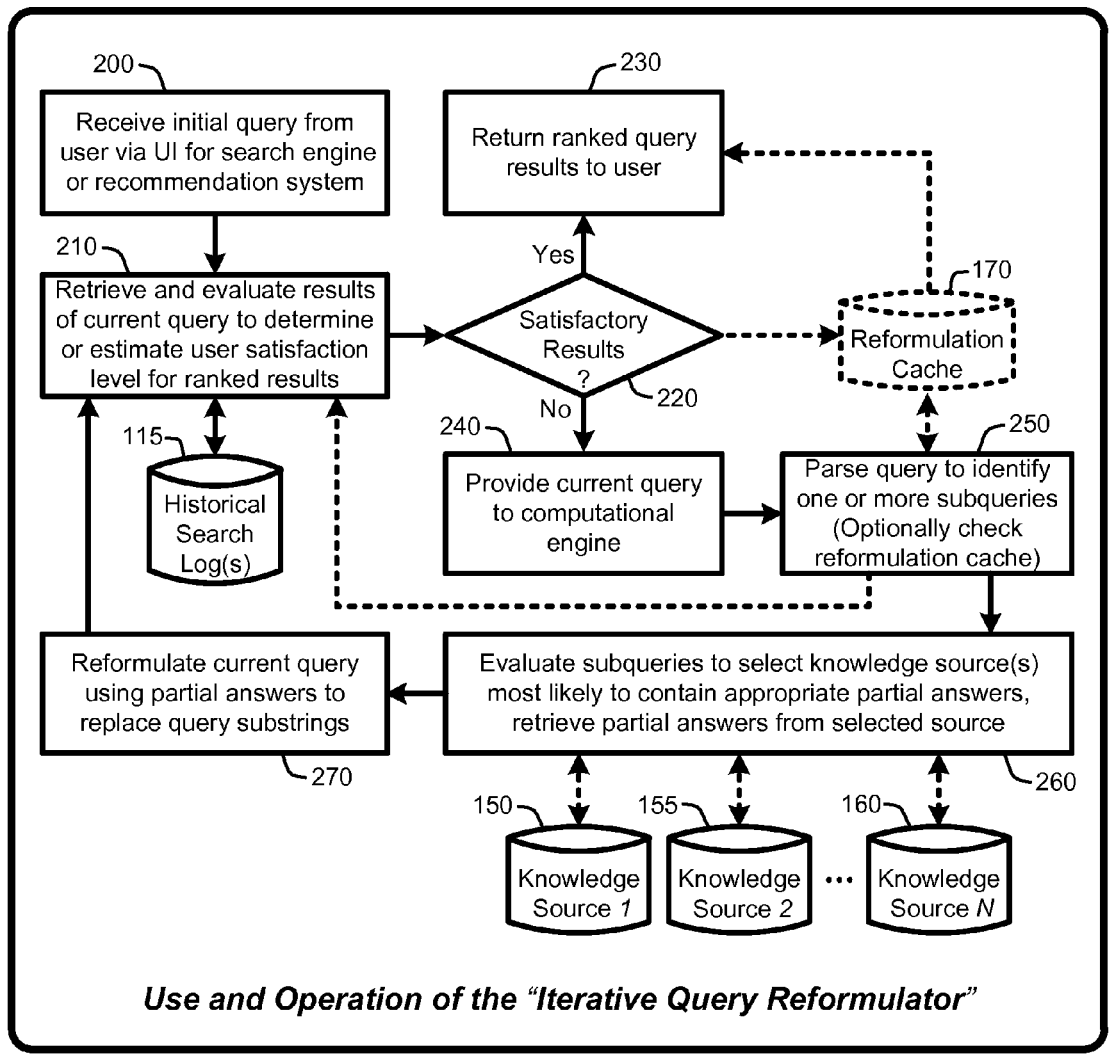
FIG. 2 illustrates a general system flow diagram that illustrates exemplary methods for implementing various embodiments of the Iterative Query Reformulator, as described herein.

3.0 Operational Summary of the Iterative Query Reformulator:

The processes described above with respect to FIG. 1 and in further view of the detailed description provided above in Sections 1 and 2 are illustrated by the general operational flow diagram of FIG. 2. In particular, FIG. 2 provides an exemplary operational flow diagram that summarizes the operation of some of the various embodiments of the Iterative Query Reformulator that are discussed above. Note that FIG. 2 is not intended to be an exhaustive representation of all of the various embodiments of the Iterative Query Reformulator described herein, and that the embodiments represented in FIG. 2 are provided only for purposes of explanation.

Further, it should be noted that any boxes and interconnections between boxes that may be represented by broken or dashed lines in FIG. 2 may represent optional or alternate embodiments of the Iterative Query Reformulator described herein, and that any or all of these optional or alternate embodiments, as described below, may be used in combination with other alternate embodiments that are described throughout this document.

In general, as illustrated by FIG. 2, the Iterative Query Reformulator begins operation by receiving 200 an initial query from user via a user interface (UI) for a search engine or a recommendation system. This user input is received using conventional techniques, including, but not limited to text input, speech input, or input using a pointing device or the like.

Once the initial query (now referred to as a "current query") has been received, the search engine or recommendation system retrieves 210 a set of ranked results corresponding to the current query, and evaluates those results to determine or estimate a user satisfaction level for ranked results. More specifically, as discussed above, the ranked query results are evaluated in view of one or more historical search logs 115 comprising user metrics, such as the CTR corresponding to particular results for the current query. Consequently, this evaluation is able to determine or estimate a user satisfaction level for each of the ranked results based on the prior behavior of very large numbers of users (using the historical search logs 115 for those users). In general, query results having a high CTR will correspond to higher satisfaction levels, with results having a low CTR corresponding to lower satisfaction levels. However, it should be appreciated that there are a variety of metrics that can be mined from the historical search logs 115 for use in determining or estimating user satisfaction levels with any particular set of ranked results returned in response to the current query, and that CTR is simply one such metric that is discussed for purposes of explanation.

If this satisfaction level evaluation indicates satisfactory results 220, then the Iterative Query Reformulator simply returns 230 the ranked results of the current query to the user. However, in the case that the evaluation of the ranked results associated with the current query does not indicate satisfactory results 220, the Iterative Query Reformulator instead provides 240 the current query to a computational engine for further processing.

In particular, when the evaluation of the ranked results for the current query does not indicate satisfactory results 220, the computational engine first parses 250 the current query to identify one or more subqueries. The computational engine then evaluates 260 the subqueries to select one or more knowledge sources (150, 155, and/or 160) that are most likely to contain appropriate partial answers. These partial answers are then retrieved from the selected knowledge sources (150, 155, and/or 160).

The retrieved partial answers are then used to reformulate 270 the current query by using the retrieved partial answers to replace the corresponding query substrings. The reformulated query (now the current query) is then sent back to the search engine or recommendation system in order to return 230 the ranked results of the cached reformulated query to the user, assuming satisfactory results 220 for the reformulated query. If those results are not satisfactory, than another iteration of parsing and reformulation is used to further refine the current query until such time as the corresponding query results are satisfactory, or until further reformulations are not possible.

As noted above, in various embodiments, an optional reformulation cache 170 containing satisfactory query results associated with previously reformulated queries is used. In this embodiment, the reformulation cache 170 is checked prior to query parsing to see whether the current query has previously been reformulated to produce satisfactory query results. If so, then the cached reformulated query is simply passed directly back to the search engine or recommendation system which then retrieves the query results that are returned 230 to the user. Note also, that in a related embodiment, the query results are stored in the reformulation cache 170 along with the reformulate query. In this case, the cached query results are simply presented directly to the user whenever the query cache contains a match to the query that has been satisfactorily reformulated.

Figure 3:
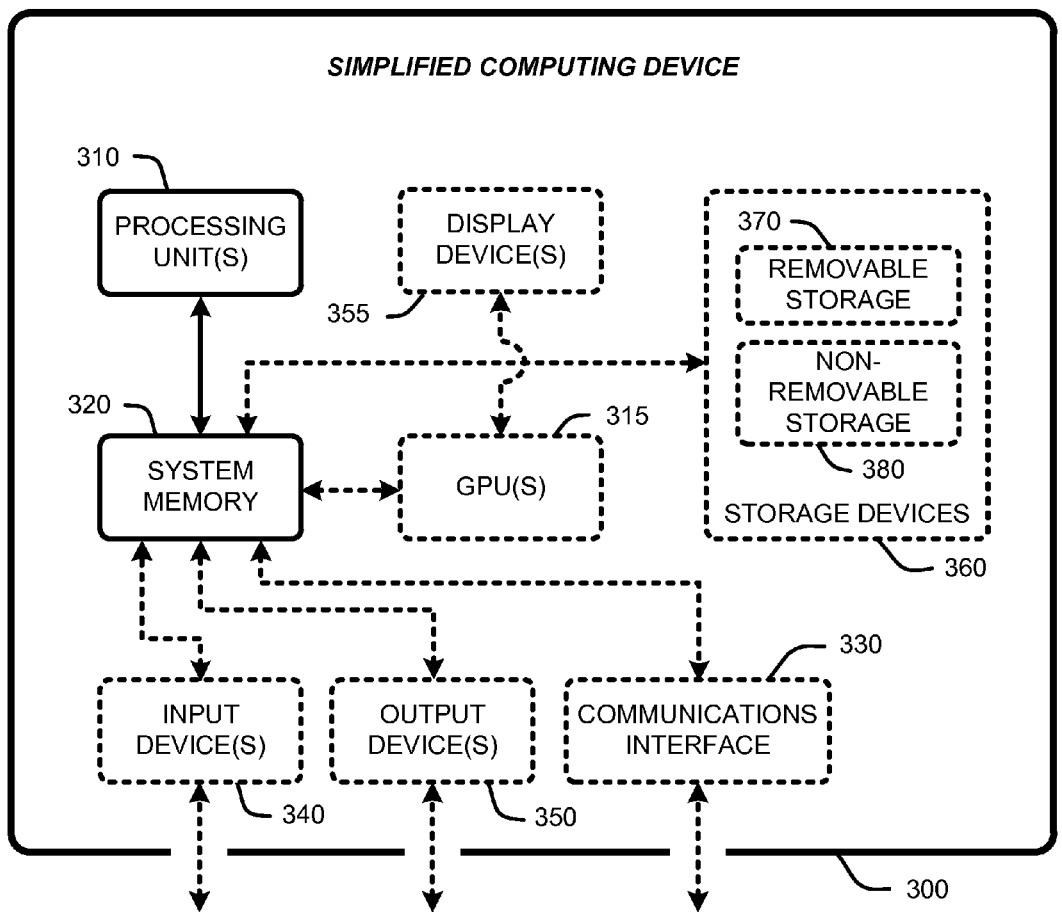
FIG. 3 is a general system diagram depicting a simplified general-purpose computing device having simplified computing and I/O capabilities for use in implementing various embodiments of the Iterative Query Reformulator, as described herein.

4.0 Exemplary Operating Environments:

The Iterative Query Reformulator described herein is operational within numerous types of general purpose or special purpose computing system environments or configurations. FIG. 3 illustrates a simplified example of a general-purpose computer system on which various embodiments and elements of the Iterative Query Reformulator, as described herein, may be implemented. It should be noted that any boxes that are represented by broken or dashed lines in FIG. 3 represent alternate embodiments of the simplified computing device, and that any or all of these alternate embodiments, as described below, may be used in combination with other alternate embodiments that are described throughout this document.

For example, FIG. 3 shows a general system diagram showing a simplified computing device 300. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Iterative Query Reformulator, the device should have a sufficient computational capability and system memory to enable basic computational operations. In particular, as illustrated by FIG. 3, the computational capability is generally illustrated by one or more processing unit(s) 310, and may also include one or more GPUs 315, either or both in communication with system memory 320. Note that that the processing unit(s) 310 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 3 may also include other components, such as, for example, a communications interface 330. The simplified computing device of FIG. 3 may also include one or more conventional computer input devices 340 (e.g., pointing devices, keyboards, audio input devices, video input devices, haptic input devices, devices for receiving wired or wireless data transmissions, etc.). The simplified computing device of FIG. 3 may also include other optional components, such as, for example, one or more conventional computer output devices 350 (e.g., display device(s) 355, audio output devices, video output devices, devices for transmitting wired or wireless data transmissions, etc.). Note that typical communications interfaces 330, input devices 340, output devices 350, and storage devices 360 for general-purpose computers are well known to those skilled in the art, and will not be described in detail herein.

The simplified computing device of FIG. 3 may also include a variety of computer readable media. Computer readable media can be any available media that can be accessed by simplified computing device 300 via storage devices 360 and includes both volatile and nonvolatile media that is either removable 370 and/or non-removable 380, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Iterative Query Reformulator described herein, or portions thereof, may be stored, received, transmitted, or read from any desired combination of computer or machine readable media or storage devices and communication media in the form of computer executable instructions or other data structures.

Finally, the Iterative Query Reformulator described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Iterative Query Reformulator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Iterative Query Reformulator. It is intended that the scope of the invention be limited not by this detailed description, but rather by the claims appended hereto.

What is claimed is:

1. A method for providing query results in response to a user query, comprising using a computing device to perform steps for:
   receiving a current user query having multiple search terms;
   evaluating the current user query to identify one or more subqueries, each subquery comprised of one or more of the search terms of the current user query;
   evaluating each subquery to select one or more structured data sets from among a plurality of structured data sets from which to retrieve a partial answer corresponding each subquery;
   for each partial answer retrieved from a selected structured data set, reformulating the current user query to construct a reformulated query by replacing the corresponding subquery of the current user query with the corresponding partial answer;
   retrieving a set of ranked search results corresponding to reformulated query;
   iteratively repeating the preceding steps, with the resulting reformulated query being used to replace the current user query in each iteration, until one or more of the ranked search results have a sufficiently high confidence level; and
   when one or more of the ranked search results have a sufficiently high confidence level, presenting the set of ranked search results on a display device.

2. The method of claim 1 wherein evaluating the current user query to identify one or more subqueries further comprises steps for identifying one or more "entities" and associated "properties" that define entity characteristics.

3. The method of claim 1 further comprising steps for, prior to presenting the set of ranked search results on a display device, evaluating the ranked search results corresponding to reformulated query to determine a user satisfaction level from one or more historical user metrics relative to a predetermined threshold, and if the user satisfaction level is below the threshold, performing steps for:
   evaluating the reformulated query to identify one or more subqueries, each subquery comprised of one or more of the search terms of the reformulated query;
   evaluating each subquery to select one or more structured data sets from among a plurality of structured data sets from which to retrieve a partial answer corresponding each subquery;
   for each partial answer retrieved from a selected structured data set, reformulating the previously reformulated query to construct a new reformulated query by replacing the corresponding subquery of the previously reformulated query with the corresponding partial answer; and retrieving a set of ranked search results corresponding to the new reformulated query.

4. The method of claim 3 wherein the evaluating the ranked search results corresponding to current query to determine the user satisfaction level further comprises evaluating user click through rates (CTR) from historical search logs having entries corresponding to the ranked results to determine the user satisfaction level.

5. The method of claim 1 further comprising steps for providing a historical "reformulation cache" comprising a plurality of reformulated queries constructed from prior user queries of a plurality of users.

6. The method of claim 5 further comprising steps for, prior to evaluating the user query to identify one or more subqueries, checking the reformulation cache to determine whether the current user query has been previously reformulated, and if so, using the corresponding reformulated query from the reformulation cache to retrieve and present the set of ranked search results without identifying subqueries and retrieving partial answers for subqueries.

7. The method of claim 1 further comprising steps for receiving user feedback to select from two or more possible subqueries when evaluating the current user query to identify one or more subqueries.

8. The method of claim 1 wherein a computational engine is used to identify the subqueries, select the structured data sets, and retrieve the partial answers for each subquery.

9. The method of claim 1 wherein the set of ranked search results are presented to the user via a search engine user interface.

10. The method of claim 1 wherein the set of ranked search results are presented to the user via a recommendation system user interface.

11. A system for improving relevance of search results, comprising:
a user input device for receiving a current query from a user;
a user satisfaction measurement device for evaluating one or more user metrics within a set of historical search logs for determining a user satisfaction level for a set of query results corresponding to the current query;
a computational engine device for iteratively reformulating the current query to construct a new current query, with such iterations repeating until the user satisfaction level exceeds a predetermined threshold, and wherein iteratively reformulating the current query comprises:
evaluating the current query to identify one or more subqueries, each subquery comprised of one or more of the search terms of the current query,
evaluating each subquery to select one or more structured data sets from among a plurality of structured data sets from which to retrieve a partial answer corresponding each subquery,
for each partial answer retrieved from a selected structured data set, reformulating the current query to construct a new current query by replacing the corresponding subquery with the corresponding partial answer, and
retrieving a set of ranked search results corresponding to the new current query; and
presenting the set of ranked search results on a display device when the user satisfaction level exceeds the predetermined threshold.

12. The system of claim 11 wherein evaluating the current query to identify one or more subqueries further comprises identifying one or more "entities" and associated "properties" that define entity characteristics.

13. The system of claim 11 wherein determining the user satisfaction level further comprises evaluating user click through rates (CTR) from the historical search logs for entries corresponding to the ranked search results to determine the user satisfaction level.

14. The system of claim 11 further comprising a historical "reformulation cache" comprising a plurality of reformulated queries constructed from prior queries of a plurality of users, and, prior to iteratively reformulating the current query to construct the new current query:
checking the reformulation cache to determine whether the current query has been previously reformulated; and
if the current query has been previously reformulated, using the corresponding reformulated query from the reformulation cache to retrieve and present the ranked search results without performing the iterative reformulation.

15. The system of claim 11 further comprising a user feedback device for receiving user feedback to select from two or more possible subqueries when evaluating the current query to identify one or more subqueries.

16. A hardware computer-readable storage device having computer executable instructions stored therein for improving relevance of search results in response to a user query, said instructions comprising:
for receiving a current query from a user;
evaluating a set of historical search logs for determining a user satisfaction level for a set of query results returned in response to the current query;
iteratively reformulating the current query to construct a new current query, with such iterations repeating until the user satisfaction level exceeds a predetermined threshold, and wherein iteratively reformulating the current query comprises instructions for:
evaluating the current query to identify one or more subqueries, each subquery comprised of one or more of the search terms of the current query,
evaluating each subquery to select one or more structured data sets from among a plurality of structured data sets from which to retrieve a partial answer corresponding each subquery,
for each partial answer retrieved from a selected structured data set, reformulating the current query to construct a new current query by replacing the corresponding subquery with the corresponding partial answer, and
retrieving a set of ranked search results corresponding to the new current query; and
presenting the set of ranked search results on a display device when the user satisfaction level exceeds the predetermined threshold.

17. The computer-readable storage device of claim 16 wherein evaluating the current query to identify one or more subqueries further comprises identifying one or more "entities" and associated "properties" that define entity characteristics.

18. The computer-readable storage device of claim 16 wherein determining the user satisfaction level further comprises evaluating one or more user metrics from the historical search logs for entries corresponding to the ranked search results to determine the user satisfaction level.

19. The computer-readable storage device of claim 16 further comprising a historical "reformulation cache" comprising a plurality of reformulated queries constructed from prior queries of a plurality of users, and, prior to iteratively reformulating the current query to construct the new current query:
- checking the reformulation cache to determine whether the current query has been previously reformulated; and
- if the current query has been previously reformulated, using the corresponding reformulated query from the reformulation cache to retrieve and present the ranked search results without performing the iterative reformulation.

20. The computer-readable storage device of claim 16 further comprising receiving user feedback to select from two or more possible subqueries when evaluating the current query to identify one or more subqueries.

* * * * *